(12) United States Patent
Lang et al.

(10) Patent No.: US 11,532,225 B2
(45) Date of Patent: Dec. 20, 2022

(54) UNMANNED SYSTEM (US) FOR SAFETY DEVICE TESTING

(71) Applicant: Honeywell International Inc., Morris Plains, NJ (US)

(72) Inventors: Scott Lang, Geneva, IL (US); Michael Lynch, Madison, CT (US); Donna Burns, Wayzata, MN (US); Rich Lau, New York City, NY (US)

(73) Assignee: Honeywell International Inc., Charlotte, NC (US)

( * ) Notice: Subject to any disclaimer, the term of this patent is extended or adjusted under 35 U.S.C. 154(b) by 816 days.

(21) Appl. No.: 16/437,817

(22) Filed: Jun. 11, 2019

(65) Prior Publication Data
US 2020/0394899 A1  Dec. 17, 2020

(51) Int. Cl.
| | |
|---|---|
| *G08B 29/12* | (2006.01) |
| *A62C 37/50* | (2006.01) |
| *G06V 10/40* | (2022.01) |
| *G08B 17/06* | (2006.01) |
| *G08B 17/10* | (2006.01) |
| *H04L 67/12* | (2022.01) |
| *G06V 30/10* | (2022.01) |

(52) U.S. Cl.
CPC ............. *G08B 29/12* (2013.01); *A62C 37/50* (2013.01); *G06V 10/40* (2022.01); *G06V 30/10* (2022.01); *G08B 17/06* (2013.01); *G08B 17/10* (2013.01); *H04L 67/12* (2013.01)

(58) Field of Classification Search
CPC ........ G08B 29/12; G08B 17/06; G08B 17/10; A62C 37/50; G06V 10/40; G06V 30/10; H04L 67/12
See application file for complete search history.

(56) References Cited

U.S. PATENT DOCUMENTS

| 8,930,044 B1 | 1/2015 | Peeters et al. |
| 9,334,051 B2 | 5/2016 | Masticola et al. |

(Continued)

FOREIGN PATENT DOCUMENTS

| WO | 2018010915 A1 | 1/2018 |
| WO | 2018069477 A1 | 4/2018 |

OTHER PUBLICATIONS

Wright, "Human Beats AI in a Drone Race, But Just Barely", https://www.airspacemag.com/daily-planet/drone-racing-human-barely-beats-machine-180967489/, Dec. 12, 2017, 3 pages.

(Continued)

*Primary Examiner* — Mohamed Barakat
(74) *Attorney, Agent, or Firm* — Brooks, Cameron & Huebsch, PLLC

(57) ABSTRACT

Methods, devices, and systems for an unmanned system (US) for safety device testing are described herein. In some examples, one or more embodiments include a processor and a memory having instructions stored thereon which, when executed by the processor, cause the processor to capture, using an imaging device of the US, an image of a safety device, determine information corresponding to the safety device based on the image, communicate the determined information to a fire system network, receive, from the fire system network, a test procedure associated with the safety device, perform the test procedure on the safety device, and communicate a result of the test procedure to the fire system network.

20 Claims, 5 Drawing Sheets

(56) References Cited

U.S. PATENT DOCUMENTS

| | | | |
|---|---|---|---|
| 10,311,710 B1* | 6/2019 | Bart | G08B 29/145 |
| 10,650,666 B1 | 5/2020 | Bart et al. | |
| 2017/0193828 A1* | 7/2017 | Holtzman | G08G 5/0078 |
| 2017/0301226 A1* | 10/2017 | Lang | G08B 29/14 |
| 2018/0203469 A1* | 7/2018 | Cohen | G08B 21/02 |
| 2018/0312255 A1* | 11/2018 | Illuminati | B64C 39/024 |
| 2020/0394900 A1* | 12/2020 | Lontka | H04N 7/183 |

OTHER PUBLICATIONS

Veazey, "Watch: NASA Pit Its AI Drone Against a Human Pro", https://www.theepochtimes.com/watch-nasa-pit-its-ai-drone-against-a-human-pro_2367837.html, Nov. 28, 2017, 8 pages.

* cited by examiner

| | ID ⤹254 | MANUFACTURER ⤹256 | LOCATION ⤹258 | IMAGE ⤹260 |
|---|---|---|---|---|
| | 789456 | ACME | WAREHOUSE (NORTH SIDE) | 789456.JPEG |
| | 456789 | ACME | WAREHOUSE (SOUTH SIDE) | 456789.JPEG |
| | 129821 | ACME | OFFICES (WEST SIDE) | 129821.JPEG |
| | -- | -- | -- | -- |
| | -- | -- | -- | -- |
| | -- | -- | -- | -- |

FIGURE 5B

| DEVICE INFORMATION ||||||| TEST RESULTS ||||
| DEVICE ID | TYPE | MANUFAC-TURER | MODEL # | INSTALL DATE | LOCATION | IMAGE | DATE | TIME | TEST PROCESS | TEST RESULT |
|---|---|---|---|---|---|---|---|---|---|---|
| HSD456 | SMOKE DETECTOR | ACME | 456894 | 12/1/2018 | WAREHOUSE (NORTH SIDE) | 789456.JPEG | 12/5/2018 | 12:00 PM | FILTER | PASS |
| HSD123 | SMOKE DETECTOR | ACME | 258147 | 11/15/2017 | WAREHOUSE (SOUTH SIDE) | 456789.JPEG | 12/5/2018 | 1:30 PM | ARTIFICIAL SMOKE | PASS |
| HSD789 | SMOKE DETECTOR | ACME | 369852 | 6/7/2017 | OFFICES (WEST SIDE) | 129821.JPEG | 12/5/2018 | 2:30 PM | FILTER | FAIL |
| HES582 | EXIT SIGN | ACME | 115932 | 8/2/2016 | WAREHOUSE (NORTH SIDE) | 115932.JPEG | 12/5/2018 | 3:00 PM | OBSTRUCTION | FAIL |
| HFE895 | FIRE EXTINGUISHER | ACME | 663127 | 8/10/2018 | WAREHOUSE (SOUTH SIDE) | 663127.JPEG | 12/5/2018 | 1:00 PM | EXPIRATION | PASS |
| --- | --- | --- | --- | --- | --- | --- | --- | --- | --- | --- |
| --- | --- | --- | --- | --- | --- | --- | --- | --- | --- | --- |
| --- | --- | --- | --- | --- | --- | --- | --- | --- | --- | --- |

*Fig. 5A*

| RECOMMENDATIONS | |
|---|---|
| CORRECTIVE ACTION ⟵ 521 | PROPOSED SOLUTION ⟵ 523 |
| NONE | N/A |
| NONE | N/A |
| EQUIPMENT OBSOLETE | REPLACE EQUIPMENT |
| EXIT PATHWAY BLOCKED | MOVE OBSTRUCTION |
| NONE | N/A |
| ⋮ | ⋮ |
| ⋮ | ⋮ |
| ⋮ | ⋮ |

UNMANNED SYSTEM (US) FOR SAFETY DEVICE TESTING

TECHNICAL FIELD

The present disclosure relates to methods, devices, and systems for an unmanned system (US) for safety device testing.

BACKGROUND

Facilities, such as commercial facilities, office buildings, hospitals, and the like, may have control systems that can be used during an emergency situation to manage an emergency event in and/or around the facility. Such control systems may rely on safety devices such as smoke detectors, heat detectors, carbon monoxide (CO) detectors, among other types of safety devices, to detect an emergency event.

Servicing of safety devices may be performed to ensure operation of such devices during an emergency event. For example, maintenance and/or testing of such safety devices can ensure such safety devices operate as intended in a situation in which an emergency event is taking place. Further, such servicing may be required by laws and/or other regulations in the area in which a facility including such devices is located.

BRIEF DESCRIPTION OF THE DRAWINGS

FIG. 5A illustrates a portion of an example of a Fire System Network Device database in accordance with one or more embodiments of the present disclosure.

FIG. 5B illustrates another portion of the example of the Fire System Network Device database in accordance with one or more embodiments of the present disclosure.

DETAILED DESCRIPTION

Figure 1:
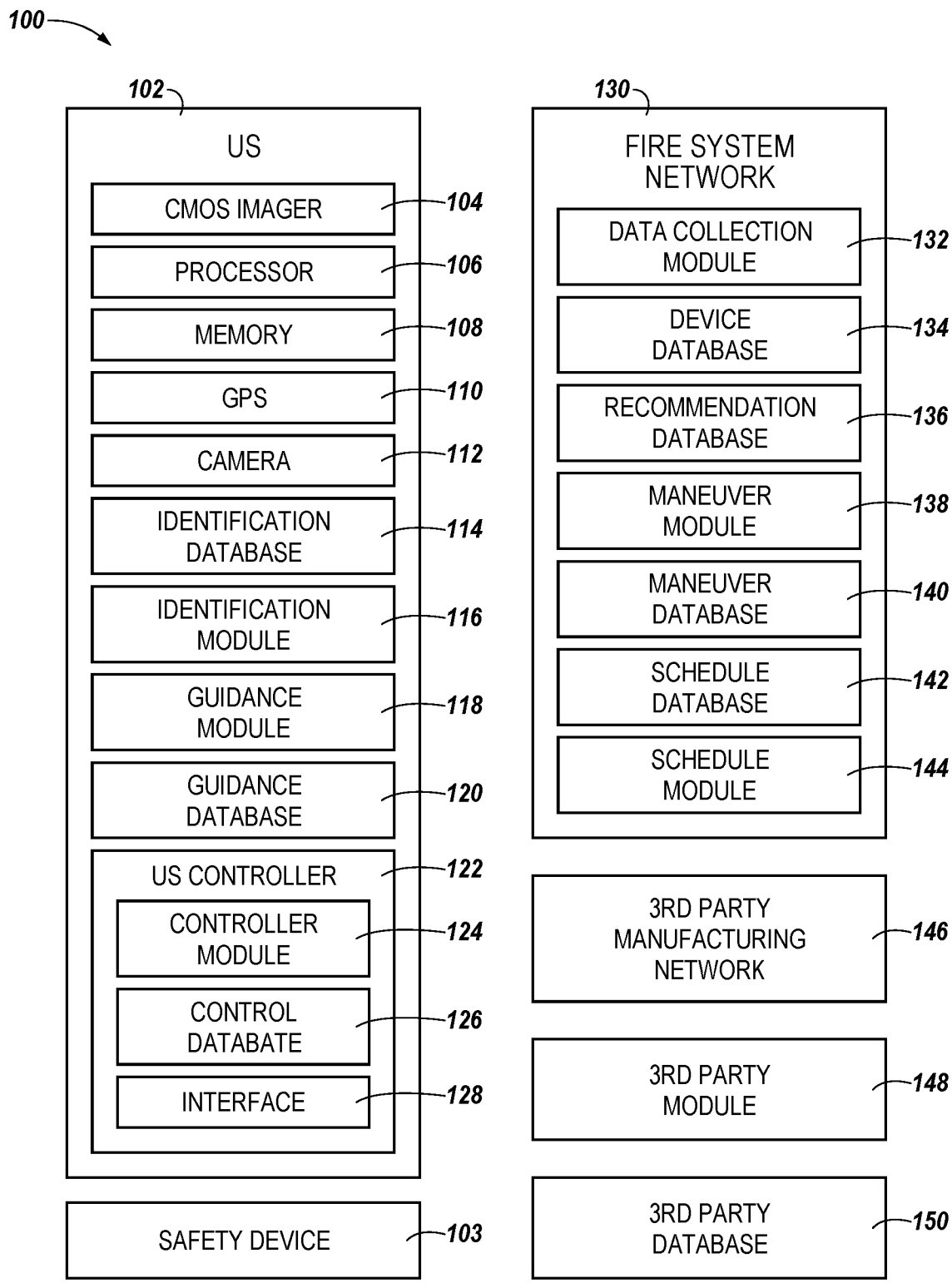
FIG. 1 is an example of a system for safety device testing in accordance with one or more embodiments of the present disclosure.

Methods, devices, and systems for an unmanned system (US) for safety device testing are described herein. In some examples, one or more embodiments include a US for safety device testing comprising a processor and a memory having instructions stored thereon which, when executed by the processor, cause the processor to capture, using an imaging device of the US, an image of a safety device, determine information corresponding to the safety device based on the image, communicate the determined information to a fire system network, receive, from the fire system network, a test procedure associated with the safety device, perform the test procedure on the safety device, and communicate a result of the test procedure to the fire system network Safety devices may be utilized in a facility to detect emergency events. As used herein, the term "safety device" refers to a device designed to detect and/or report a change in an environment in which the safety device is located. For example, safety devices may include various types of sensors to detect changes in an environment, such as a facility, which may be associated with an emergency event. The safety devices can activate in response to detection of a change in the environment in which the safety device is located. Examples of such safety devices can include smoke detectors, heat detectors, and carbon monoxide detectors, as will be further described herein.

Safety devices utilized in a facility may be serviced to ensure such devices can operate as intended in an emergency event. Some safety devices may be located in hard to reach areas. For instance, a safety device may be located near a ceiling. Servicing of such a safety device may require a technician to use a ladder or other ways to reach the safety device. Servicing of such safety devices can pose certain risks to technicians due to the difficult to reach locations of such safety devices.

A US for safety device testing, in accordance with the present disclosure, can allow for servicing of safety devices located in hard to reach areas of a facility. For instance, a US can access safety devices located in areas which may pose risks for technicians to service using traditional methods, such as using a ladder. Accordingly, safety devices may be serviced by a US, which can reduce the risk of injury to a technician by preventing the technician from having to access safety devices themselves.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component. Additionally, the designator "N", as used herein particularly with respect to reference numerals in the drawings, indicates that a number of the particular feature so designated can be included with a number of embodiments of the present disclosure. This number may be the same or different between designations.

FIG. 1 is an example of a system 100 for a US for safety device testing in accordance with one or more embodiments of the present disclosure. In some embodiments one or more portions of the system 100 can be installed in a facility. The system 100 can include US 102, safety device (e.g., SD) 103, fire system network 130, 3$^{rd}$ party manufacturer network 146, and communication network 152.

As described above, US 102 can be utilized to service the safety device 103. For example, US 102 can ensure that safety devices 103 operates as intended in a situation in which an emergency event is taking place. As used herein, the term "US" refers to vehicle without a human pilot onboard (e.g., a drone or robot).

In some examples, US 102 may be an unmanned aerial system (UAS). As used herein, the term "UAS" refers to an aircraft without a human pilot onboard. For example, the UAS can be an aircraft that can be operated autonomously and/or by remote control. US 102 can be, for example, a single rotary UAS or multi-rotor UAS such as a tricopter, quadcopter, hexacopter, octocopter, etc. In some embodiments, US 102 may include multi-rotor positioning including Quad I, Quad X, Hex I, Hex V, Hex Y, Hex IY, Oct X, Oct I, Oct V, among other examples of rotor positioning.

In some examples, US 102 may be an unmanned ground system (UGS). As used herein, the term "UGS" refers to a ground-based vehicle without a human operator onboard (e.g., a robot). For example, the UGS can be a ground-based vehicle that can be operated autonomously and/or by remote control. US 102 can be, for example, a ground-based vehicle including wheels, continuous tracks (e.g., a continuous band of treads or track plates driven by two or more wheels), among other types of ground-based vehicles.

US 102 can include a processor 106 and a memory 108 to perform test procedures and/or communicate results(s) of test procedures to the fire system network 130, as is further described herein. The memory 108 can be any type of storage medium that can be accessed by the processor 106 to perform various examples of the present disclosure. For example, the memory 108 can be a non-transitory computer readable medium having computer readable instructions (e.g., computer program instructions) stored thereon that are executable by the processor 106 for using a US for safety device testing in accordance with the present disclosure.

The memory 108 can be volatile or nonvolatile memory. The memory 108 can also be removable (e.g., portable) memory, or non-removable (e.g., internal) memory. For example, the memory 108 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 108 is illustrated as being located within the US 102, embodiments of the present disclosure are not so limited. For example, memory 108 can also be located internal to another computing resource (e.g., enabling computer readable instructions to be downloaded over the Internet or another wired or wireless connection).

In some examples, a particular safety device (e.g., safety device 103) can be selected for testing. The safety device 103 can be communicated to US 102 from a remote computing device. In some embodiments, the remote computing device is associated with the fire system network 130. For instance, the safety device 103 for testing can be communicated from the fire system network 130 to US 102 via a communication network 152. In some embodiments, the remote computing device may be a building management system, a building operations center, a remote server, etc.

The communication network 152 can, in some examples, be a wired or wireless network. In an example of a wireless network, US 102 can include a wireless transmitter and wireless receiver to communicate wirelessly with the computing device via the network relationship. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Worldwide Interoperability for Microwave Access (WiMAX), infrared (IR) communication, Public Switched Telephone Network (PSTN), radio waves, and/or the Internet, among other types of network relationships.

The US 102 can include an imaging device (illustrated in FIG. 1 as "CMOS imager 104, though it is noted that embodiments herein are not limited to CMOS imagers). The Complementary Metal Oxide Semiconductor (CMOS) Imager 104 is an electronic device that converts an optical image into an electronic signal. The CMOS imager 104 can convert the light received on a camera or imaging device lens into a digital image. In some embodiments, the CMOS imager includes an image sensor. An image sensor is a device used primarily in standalone or embedded digital cameras and imaging devices. Typically, when light strikes the lens of a camera, the image sensor captures that light, converts it into an electronic signal and then transmits it to the camera or imaging device processor, which transforms the electronic signal into a digital image.

The processor 106 can be configured to decode and execute any instructions received from one or more other electronic devices or server(s). The processor 106 may include one or more general-purpose processors and/or one or more special purpose processors. The processor 106 may be configured to execute one or more computer-readable program instructions, such as program instructions to carry out any of the functions described in this description. The memory 108 may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions. The memory may comprise modules implemented as a program.

A Global Positioning System (GPS) 110, is a radio navigation system that allows land, sea, and airborne entities to determine their exact location, velocity, and time, in all weather conditions, anywhere in the world. A camera 112 which is a device for recording visual images in the form of photographs, film, or video signals, and the signals may be transmitted to an operator display screen or user interface. An Identification Database 114 can contain the information corresponding to the safety device 103 that the US 102 is able to collect, such as serial numbers, brands, capture image, etc. Such information can be sent to the Data Collection Module 132 of the Fire System Network 130 through the Identification Module 116.

The US 102 can include a Guidance Module 118. The Guidance Module 118 can receive inputs corresponding to maneuvers from the Maneuver Module 138 of the Fire System Network 130. The maneuvers can be stored in a Guidance Database 120 in order for the US 102 to locate the safety device 103 to perform a specific service and/or test. The Guidance Database 120 can contain the specific maneuvers for the US 102 to reach a specified location of the safety device 103. A US Controller 122 can be operated by a user. The US Controller 122 can be utilized to maneuver the drone, via user inputs, for a first flight around the area and can activate a Controller Module 124. The Controller Module 124 can record the user's inputs or "maneuvers" performed on the US Controller 122. Such inputs can be made using an interface 128 on the controller 122 and can be stored in a Control Database 126 to be sent to the Fire System Network.

The Controller Module 124 can record the user's inputs or maneuvers performed on the US 102 through the US Controller 122. The Controller Module 124 can store the data in the Control Database 126. The Controller module 124 can connect to the Fire System Network 130 and can send the Control Database 126. The Control Database 126 can contain the user's inputs or maneuvers on the Drone Controller collected via the Controller Module during the first flight of the US 102. The interface 128 may either accept inputs (e.g., from users) or provide outputs (e.g., to users) or may perform both the actions. In one example, a user can interact with the interface 128 using one or more user-interactive objects and devices. The user-interactive objects and devices may comprise user input buttons, switches, knobs, levers, keys, trackballs, touchpads, cameras, microphones, motion sensors, heat sensors, inertial sensors, touch sensors, etc. The interface 128 can be implemented as a Command Line Interface (CLI), a Graphical User Interface (GUI), a voice interface, and/or a web-based user-interface, though embodiments herein are not so limited.

The Fire System Network 130 can contain information about the various fire and safety devices within the facility. The Fire System Network 130 can collect safety device data from manufacturers and can provide the information to the US 102. The Fire System Network 130 can collect user inputs or maneuvers from the US Controller 122 via the Controller Module 124 and provide the maneuvers to the US on future flights. The Fire System Network 130 can determine when the safety device 103 has scheduled services and can inform the US 102 to complete the test and/or safety procedures. A Data Collection Module 132 can receive information associated with the safety device 103 from the US 102. The Data Collection Module 132 can connect to the $3^{rd}$ Party Manufacturer Network 146 to request device information, can store the received device information in a Device Database 134, and can send the device information to the US 102. The Device Database 134 can contain information associated with the safety device 103 and can provide information to the US 102 in order to service and test the safety device 103.

A Recommendation Database 136 can contain recommendations based on the test(s) performed and the result of that testing. The recommendations can be extracted and stored in the Device Database 134, such that all device information is stored in a central location. A Maneuver Module 138 can be initiated from a Schedule Module 144 in order to prompt the US 102 to start and proceed to a location of the safety device 103 and perform the desired services and/or tests. The desired services and/or tests can be stored in the Device Database 134 and sent to the US 102.

A Maneuver Database 140 can contains the user inputs or maneuvers inputted on the Drone Controller 122, collected via the Controller Module 124, in order for the US 102 to reach the safety device 103 in order to perform the desired services and/or tests. In some embodiments, the US 102 may use video collected from the CMOS Imager 104 in order to direct the US 102 to the safety device 103. In some embodiments, this video data may be stored in the Maneuver Database 140 for training the US 102, using machine learning, to identify potential safety issues.

A Schedule Database 142 can contain dates and/or times in which certain devices (e.g., the safety device 103) are to be tested and/or serviced. A Schedule Module 144 can constantly check the Schedule Database 142 to determine if a device is to be serviced or tested. If the safety device 103 is due for service or testing, the Schedule Module 144 can initiate the Maneuver Module 138.

The 3rd Party Manufacturer Network 146 may be one or more of various manufacturers and can contain device information such as desired services, procedures, tests, testing scheduling, and/or proposed solutions for their devices. A 3rd Party Module 148 can receive a request from the Data Collection Module 132 for device information and can compare received data associated with a specific device (e.g., the safety device 103) to the 3rd Party Database. If a match is found, the corresponding data can be extracted and sent to the Data Collection Module 132. A 3rd Party Database 150 can contain information associated with devices such as desired services, procedures, tests, testing schedules, etc.

Figures 2, 3:
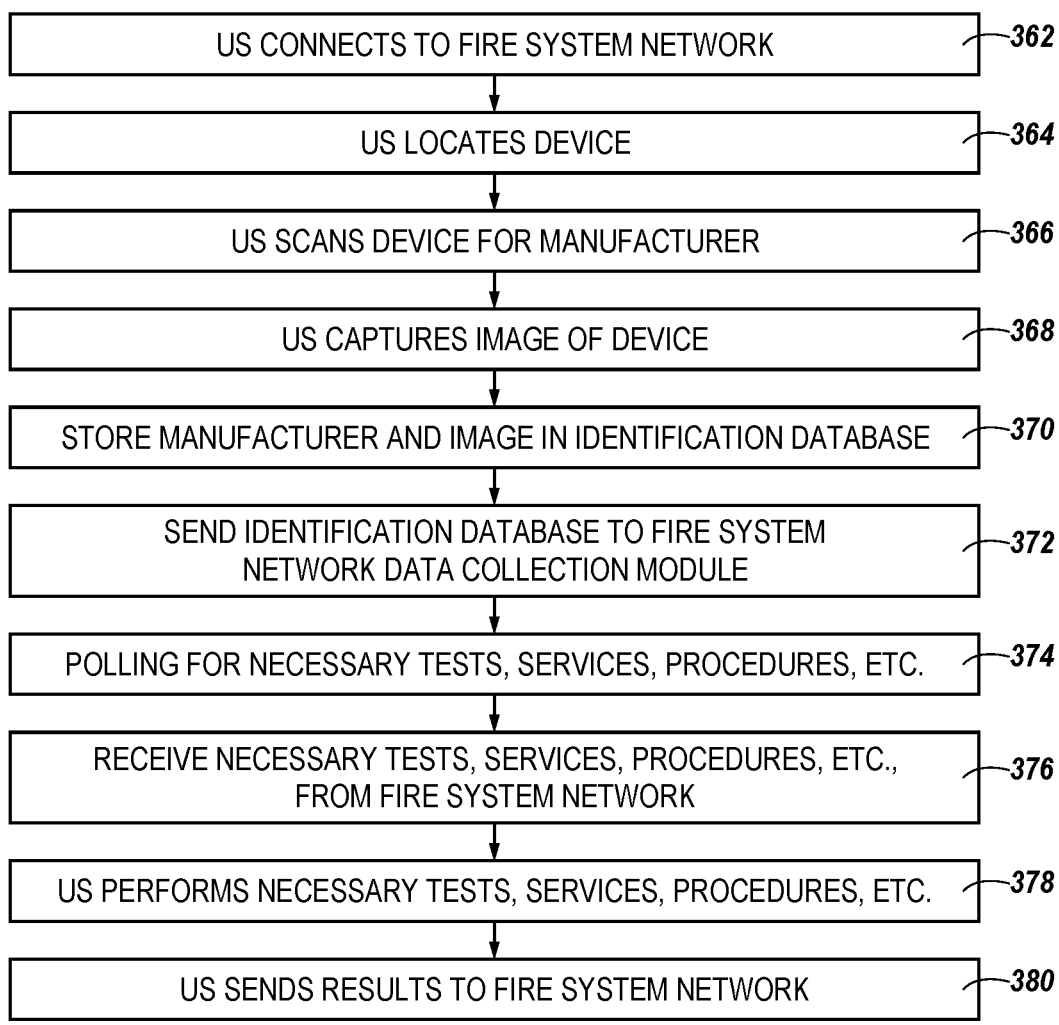
FIG. 2 illustrates an example of a US identification database in accordance with one or more embodiments of the present disclosure.
FIG. 3 illustrates a flow chart associated with safety device testing in accordance with one or more embodiments of the present disclosure.

FIG. 2 illustrates an example of a US identification database in accordance with one or more embodiments of the present disclosure. As shown in FIG. 2, the US identification database can include information corresponding to safety devices. In some embodiments, the information can include an ID number 254, a manufacturer 256, a location 258, and one or more images 260 captured of the safety devices. In some embodiments, the ID numbers can be produced and/or determined by the US. As referred to herein, safety devices include smoke detectors, carbon monoxide detectors, fire extinguishers, exit signs, emergency lights, and other safety devices.

FIG. 3 illustrates a flow chart associated with safety device testing in accordance with one or more embodiments of the present disclosure. In some embodiments, the steps of the flow chart of FIG. 3 can be executed by the US Identification Module 116, previously described in connection with FIG. 1, though embodiments herein are not so limited. At 362, the US connects to the Fire System Network. At 364, the US locates the device. Location can be accomplished through the US Controller via the Controller Module, where user inputs or maneuvers are captured and stored, or through maneuvers received from the Fire System Network through the US Guidance Module. At 366, the US uses the camera in order to scan the safety device and determine the manufacturer. In some embodiments, determining the manufacturer can be accomplished by finding the manufacturer's name and/or logo. In some embodiments, the manufacturer can be determined based on a structural appearance (e.g., shape) of the safety device. At 368, the US captures an image of the device. The manufacturer and image can be stored in the US Identification Database, at 370. The US Identification Database is sent to the Fire System Network Data Collection Module, at 372. The US can then continuously poll for the Fire System Network Data Collection Module to send the desired tests, services, procedures, etc. that are to be performed on the safety device, at 374. The US receives the desired tests, services, procedures, etc., from the Fire System Network Data Collection Module, at 376. The US Performs the desired tests, services, procedures, etc., on the device. In some embodiments, the US may have test filters attached in order to test smoke detectors. In some embodiments, the US may have aerosol containers filled with artificial smoke or air in order to test or clean a smoke detector. In some embodiments, the US or Fire System Network may have access to the fire and safety test protocols to test various devices such as smoke detectors, carbon monoxide detectors, exit signs, emergency lights, etc. and the US can capture the test results through the US camera. In some embodiments, the US may be able to test a fire extinguisher by locating the expiration date, usually located on a tag on or near the fire extinguisher and send back the results to the Fire System Network. In some embodiments, the US may be able to test exit signs by determining if the sign is lit up, if there are any obstructions in the path of the emergency exit, etc., at 378. The US sends back the results of the test, service, procedure, etc., to the Fire System Network Data Collection Module, at 380.

Figure 4:
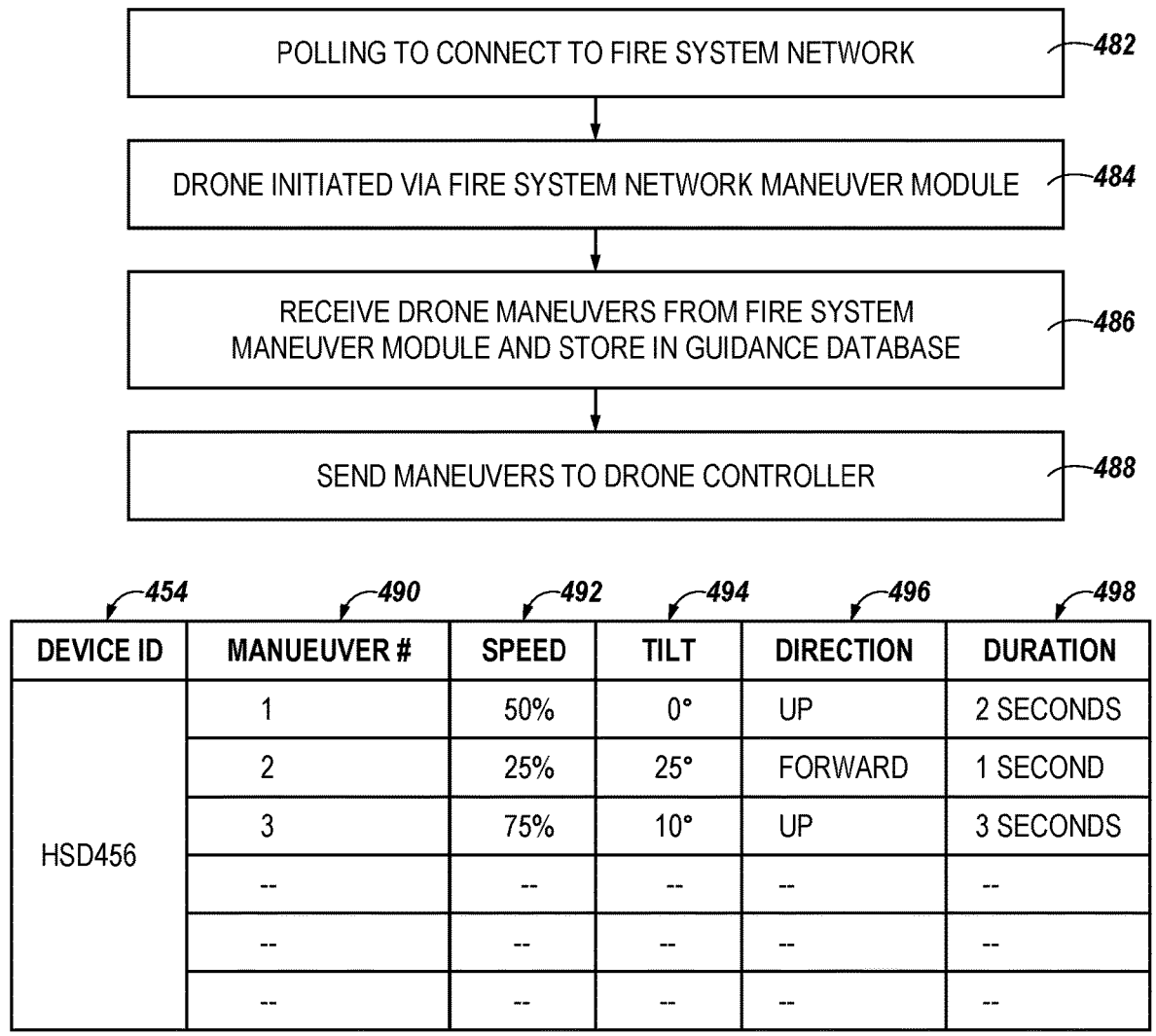
FIG. 4 illustrates another flow chart and a sequence of maneuvers of a US guidance database associated with safety device testing in accordance with one or more embodiments of the present disclosure.

FIG. 4 illustrates another flow chart and a sequence of maneuvers of a US guidance database associated with safety device testing in accordance with one or more embodiments of the present disclosure. The flow chart of FIG. 4 can be associated with determining and storing a sequence of maneuvers corresponding to user navigational inputs, for instance, and can be performed and/or executed by the US guidance module 118, previously described. The Guidance Module can continuously poll to connect to the Fire System Network, at 400. The US can be initiated through the Fire System Network Maneuver Module, at 402. The US can receive the US Maneuvers from the Fire System Network Maneuver Module and can stores the maneuvers in the Guidance Database, at 404. The maneuvers in the Guidance Database can be sent to the US Controller in order for the US to travel to the device, at 406.

The US Guidance Database contains the specific maneuvers for the US to reach a specified device location received from the Fire System Network Maneuver Module through the US Guidance Module. The database contains the device ID 454, the number of the maneuver (to be performed in order) 490, the speed 492 of the US, the tilt 494 of the US, the direction 496 of the US, and the duration 498 of the maneuver. It is noted that while these example maneuver parameters are given in FIG. 4, embodiments of the present disclosure do not limit maneuvers to particular parameters.

These maneuvers can be used to simulate a user's inputs or maneuvers while controlling the US. The inputs or maneuvers are recorded when the user of the US Controller navigates the US to the safety device. Thereafter, US inputs or maneuvers can be replicated without inputs from a user. In some embodiments, the US may use a camera with machine-vision capabilities which may have a machine vision system. A machine vision system (MVS) is a type of technology that enables a computing device to inspect, evaluate and/or identify still or moving images. These images may be recorded and allow the US to compare real-time images to the historical images in order to operate the US to the device instead of using recorded maneuvers, in some embodiments.

If it is determined that there is an additional safety device, the user navigates or maneuvers from the safety device to the additional safety device using the US Controller. The inputs or maneuvers to the additional safety device(s) are recorded when the user of the US Controller navigates the US to the additional safety device(s). It is noted that the user or operator may perform maneuvers from one safety device to another or return back to the drone docking station so that the maneuvers from the docking station and from one device to another can be stored for future use.

In some embodiments, the Fire System Network Data Collection Module can receive the US Identification Database and compare it to the Fire System Network Device Database. If it is determined that there is a match between the two databases, the Fire System Network Data Collection Module can extract the tests, services, procedures, etc. The extracted tests, services, procedures, etc. can be sent to the Drone Identification Module. If there is no match, the Fire System Network can connect to the 3rd Party Manufacturer Network. The Fire System Network Data Collection Module sends the received Identification Database to the 3rd Party Manufacturer Network to determine if there is a match. The device test schedule data is stored in the Fire System Schedule Database, and the desired tests, services, procedures, etc., can be extracted from the Fire System Network Device Database. The extracted tests, services, procedures, etc. can be sent to the US Identification Module. The Fire System Network Data Collection can receive the results from the US. The results can be stored in the Fire System Network Device Database. The results can then be compared to the Fire System Network Recommendation Database. Matching recommendations can be extracted from the Fire System Network Recommendation Database and stored in the Fire System Network Device Database.

FIGS. 5A-5B illustrate an example of a Fire System Network Device database in accordance with one or more embodiments of the present disclosure. The Fire System Network Device Database contains information on the device, test results of the device, and recommendations for the test results. This information can be collected through the Fire System Network Data Collection Module and provided to the US in order to service and test the safety device(s). The database can contain device information such as a device ID 554, the type of device 507, the manufacturer 556, the model number 509 of the device, the installation date 511 of the device, the location 558 of the device, and/or an image 560 of the device (among other device information).

In some embodiments, the Fire System Network Device database can contain the test results of the device, such as the test date 513, the time 515 of the test, the test process performed 517, and the test result 519. In some embodiments, the database can contain recommendations for the device based on the test results, such as corrective action 521 or action to be addressed by a user, operator or tester, and a proposed solution 523 to fix the action to be corrected.

US 102 can include a test kit. As used herein, the term "test kit" refers to a system including components designed to provide a detectable change in an environment to cause a response from a safety device. For example, the test kit included on US 102 can perform a particular action to cause a detectable change in an environment so as to cause a safety device to detect the change in the environment caused by the particular action performed by the test kit, as is further described herein.

US 102 can initiate a testing of the safety device 103 using the test kit. US 102 can initiate testing of safety device 103 by using the test kit included in US 102 to cause the safety device to activate. For instance, the test kit can perform a particular action to cause a detectable change in the safety device 103 to test safety device 103 (e.g., determine whether the safety device activates in response to the detectable change). That is, US 102 can use the test kit to determine whether safety device 103 can detect the change in the environment caused by the test kit included on US 102.

In an example, safety device 103 can be a smoke detector. The smoke detector can be an ionization smoke detector, photoelectric smoke detector, aspirating smoke detector, and/or laser smoke detector, among other types of smoke detectors.

In such an example, testing of the safety device 103 can include the test kit included on US 102 generating smoke to interact with the smoke detector. For example, the US 102 can cause components in the test kit to generate smoke to cause a detectable change in an environment (e.g., the presence of smoke) around the smoke detector so as to cause the smoke detector to detect the smoke generated by the test kit.

In some examples, the test kit can include an aerosol stimulant. For example, the US 102 can cause the test kit to generate aerosol (e.g., smoke) to interact with the smoke detector. That is, the aerosol can cause the detectable change in the environment (e.g., the presence of smoke or other aerosol) around the smoke detector to activate the smoke detector.

In some examples, the test kit can cause a chemical reaction to occur between substances included in the test kit. The chemical reaction can be an exothermic reaction and/or an electrochemical reaction. As used herein, the term "exothermic reaction" refers to a chemical reaction that release energy through light and/or heat (e.g., thermal energy). As used herein, the term "electrochemical reaction" refers to a process caused by the passage of an electric current between two substances. For example, an electric current can be passed between two substances included in the test kit to cause a chemical reaction to cause a detectable change in an environment around safety device 103. In some examples, the two substances can be magnesium and water. For instance, a reaction between magnesium and water can cause a detectable change in an environment around safety device 103 to test safety device 103. However, embodiments of the present disclosure are not limited to magnesium and water. For example, the substances included in the test kit to cause the chemical reaction to cause the detectable change in an environment around safety device 103 can be any other substances that can undergo a chemical reaction to cause a detectable change in an environment around a safety device 103.

In some examples, the US 102 can cause the test kit to generate a chemical reaction. The chemical reaction can produce smoke to interact with the smoke detector. That is, the smoke produced by the chemical reaction can cause the detectable change in the environment (e.g., the presence of smoke) around the smoke detector to activate the smoke detector.

In an example, safety device 103 can be a heat detector. As used herein, the term "heat detector" refers to a device that senses convected thermal energy using a heat sensitive element. The heat detector can be a rate-of-rise heat detector and/or a fixed temperature heat detector, among other types of heat detectors.

In such an example, testing of the safety device 103 can include the test kit included on US 102 generating thermal energy to interact with the heat detector. For example, the US 102 can cause components in the test kit to generate thermal energy to cause a detectable change in an environment (e.g., a particular rate in a rise of temperature that exceeds a threshold rate of temperature rise, or a temperature exceeding a particular threshold temperature) around the heat detector so as to cause the heat detector to detect the thermal energy generated by the test kit.

In some examples, the US 102 can cause the test kit to generate a chemical reaction. The chemical reaction can produce thermal energy to interact with the heat detector. That is, the thermal energy produced by the chemical reaction can cause the detectable change in the environment (e.g., the presence of thermal energy) around the heat detector to activate the heat detector.

In an example, safety device 103 can be a carbon monoxide (CO) detector. As used herein, the term "CO detector" refers to a device that senses CO gas. The smoke detector can be an opto-chemical CO detector, biomimetic CO detector, electrochemical CO detector, and/or a semiconductor CO detector, among other types of CO detectors.

In such an example, testing of the safety device 103 can include the test kit included on US 102 generating CO to interact with the CO detector. For example, the US 102 can cause components in the test kit to generate CO to cause a detectable change in an environment (e.g., the presence of CO) around the CO detector so as to cause the CO detector to detect the CO generated by the test kit.

In some examples, the test kit can include an aerosol CO stimulant. The aerosol CO stimulant can be hydrogen, CO, etc. For example, the US 102 can cause the test kit to generate aerosol CO stimulant to interact with the CO detector. That is, the aerosol CO can cause the detectable change in the environment (e.g., the presence of CO) around the CO detector to activate the CO detector.

In some examples, the US 102 can cause the test kit to generate a chemical reaction. The chemical reaction can produce CO to interact with the CO detector. That is, the CO produced by the chemical reaction can cause the detectable change in the environment (e.g., the presence of CO) around the CO detector to activate the CO detector. In some examples, the chemical reaction can produce hydrogen to interact with the CO detector. That is, the hydrogen produced by the chemical reaction can cause the detectable change in the environment (e.g., the presence of hydrogen) around the CO detector to activate the CO detector due to cross sensitivity of the sensor to hydrogen.

As described above, the test kit included on US 102 can be utilized to test different types of safety devices using particular components included in a test kit. In some examples, the test kit included on US 102 can include multiple test mechanisms and/or components to test multiple safety devices.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An unmanned system (US) for safety device testing, comprising:
a processor; and
a memory having instructions stored thereon which, when executed by the processor, cause the processor to:
capture, using an imaging device of the US, an image of a safety device;
determine information corresponding to the safety device based on the image;
communicate the determined information to a fire system network;
receive, from the fire system network, a test procedure associated with the safety device;
perform the test procedure on the safety device; and
communicate a result of the test procedure to the fire system network.

2. The US of claim 1, including instructions to determine the information corresponding to the safety device based on text printed on the safety device.

3. The US of claim 1, including instructions to determine the information corresponding to the safety device based on a structural appearance of the safety device.

4. The US of claim 1, including instructions to determine a serial number associated with the safety device based on the image.

5. The US of claim 1, including instructions to determine a brand of the safety device based on the image.

6. The US of claim 1, including instructions to determine a location of the safety device.

7. The US of claim 1, including instructions to communicate the image of the safety device to the fire system network.

8. The US of claim 1, wherein the safety device includes at least one of:
a smoke detector;
a heat detector; and
a carbon monoxide detector.

9. The US of claim 1, wherein the instructions to perform the test procedure include instructions to:
generate an aerosol proximal to the safety device;
generate thermal energy proximal to the safety device; or
generate carbon monoxide proximal to the safety device.

10. A method for safety device testing, comprising:
executing a first flight of an unmanned system (US), wherein executing the first flight includes:
receiving a first set of user inputs to navigate the US from a first location to a safety device at a second location;
determining a first sequence of maneuvers corresponding to the first set of user inputs;
storing the sequence of maneuvers in memory; and
executing a second flight of the US, wherein executing the second flight includes:
performing the first sequence of maneuvers such that the US reaches the safety device at the second location;
capturing, using an imaging device of the US, an image of the safety device;
determining information corresponding to the safety device based on the image;
communicating the determined information to a fire system network;
receiving, from the fire system network, a test procedure associated with the safety device;
performing the test procedure on the safety device; and
communicating a result of the test procedure to the fire system network.

11. The method of claim 10, wherein executing the first flight of the US includes:
receiving a second set of user inputs to navigate the US from the second location to a different safety device at a third location;
determining a second sequence of maneuvers corresponding to the second set of user inputs; and
storing the second sequence of maneuvers in memory.

12. The method of claim 11, wherein executing the second flight of the US includes:
performing the second sequence of maneuvers such that the US reaches the different safety device at the third location;
capturing, using the imaging device of the US, an image of the different safety device;
determining information corresponding to the different safety device based on the image;
communicating the determined information to the fire system network;
receiving, from the fire system network, a different test procedure associated with the different safety device;
performing the different test procedure on the different safety device; and
communicating a result of the different test procedure to the fire system network.

13. The method of claim 10, wherein receiving the first set of user inputs includes receiving at least one of:
a velocity adjustment of the US;
a heading adjustment of the US; and
a tilt adjustment of the US.

14. The method of claim 10, wherein the method includes receiving the first set of user inputs via an interface of a controller in wireless communication with the US.

15. A system for safety device testing, comprising:
an unmanned system (US);
a safety device; and
a remote computing device of a fire system network configured to execute instructions stored on a non-transitory medium to:
receive an image of the safety device captured by an imaging device of the US;
receive information corresponding to the safety device determined by the US based on the image;
determine a test procedure to perform on the safety device based on the information;
communicate the test procedure to the US;
receive a result of the test procedure performed by the US; and
store the result of the test procedure performed by the US in memory.

16. The system of claim 15, wherein the remote computing device is configured to receive the result of the test procedure from the US.

17. The system of claim 15, wherein the remote computing device is configured to receive the result of the test procedure from the safety device.

18. The system of claim 15, wherein the remote computing device is configured to store the result of the test procedure in association with:
a device identifier of the safety device;

a type of the safety device;
a manufacturer of the safety device;
a model number of the safety device;
an installation date of the safety device; and
a location of the safety device.

19. The system of claim 15, wherein the remote computing device is configured to store the result of the test procedure in association with:
a date of the performance of the test procedure:
a time of the performance of the test procedure; and
a description of the test procedure.

20. The system of claim 15, wherein the remote computing device is configured to determine a recommendation associated with the safety device responsive to a determination that the result of the test procedure includes the safety device failing the test procedure.

* * * * *